US007243001B2

(12) United States Patent
Janert et al.

(10) Patent No.: US 7,243,001 B2
(45) Date of Patent: Jul. 10, 2007

(54) TIME-BASED WAREHOUSE MOVEMENT MAPS

(75) Inventors: Philipp K. Janert, Seattle, WA (US); Jonathan J. Shakes, Mercer Island, WA (US); Nicholas M. Hanssens, Seattle, WA (US); Dennis R. Hodge, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 10/868,392

(22) Filed: Jun. 15, 2004

(65) Prior Publication Data

US 2005/0278062 A1 Dec. 15, 2005

(51) Int. Cl.
G06F 7/00 (2006.01)
(52) U.S. Cl. ...................... 700/214; 700/213
(58) Field of Classification Search ................ 700/214, 700/216, 213, 230; 235/385; 340/5.92, 340/5.9, 825.52, 825.36; 414/268, 273
See application file for complete search history.

(56) References Cited

U.S. PATENT DOCUMENTS

| 5,528,232 | A | 6/1996 | Verma et al. | |
|---|---|---|---|---|
| 6,577,304 | B1 | 6/2003 | Yablonski et al. | |
| 6,600,418 | B2 * | 7/2003 | Francis et al. | 340/572.1 |
| 6,711,458 | B1 * | 3/2004 | Kofoed | 700/213 |
| 6,744,436 | B1 | 6/2004 | Chirieleison, Jr. et al. | |
| 6,996,538 | B2 | 2/2006 | Lucas | |
| 7,027,999 | B2 | 4/2006 | Smith et al. | |
| 7,031,801 | B1 * | 4/2006 | Hodge et al. | 700/213 |
| 7,031,802 | B2 * | 4/2006 | Bash et al. | 700/214 |
| 2002/0174038 | A1 | 11/2002 | Chien | |
| 2003/0004839 | A1 | 1/2003 | Lin Kuang et al. | |
| 2003/0069665 | A1 * | 4/2003 | Haag | 700/217 |
| 2004/0068443 | A1 | 4/2004 | Hopson et al. | |
| 2004/0254674 | A1 * | 12/2004 | Nojo et al. | 700/213 |
| 2005/0171633 | A1 * | 8/2005 | Inch et al. | 700/214 |
| 2006/0206235 | A1 * | 9/2006 | Shakes et al. | 700/216 |

FOREIGN PATENT DOCUMENTS

EP 732 278 9/1996

OTHER PUBLICATIONS

International Search Report and Written Opinion, PCT/US2005/021224, Sep. 12, 2005, 8 pages.

* cited by examiner

*Primary Examiner*—Khoi H. Tran
(74) *Attorney, Agent, or Firm*—Robert C. Kowert; Meyertons, Hood, Kivlin, Kowert & Goetzel, P.c.

(57) ABSTRACT

A computer software facility for generating and implementing a temporal map depicting a relationship between locations in a warehouse or distribution center is described. The facility tracks the movement in the warehouse, including the time it takes for mobile elements to move between a pair of identifiable locations. Based on the tracking, the facility produces movement time records for multiple location pairs in the warehouse. The facility then generates a map of the warehouse. Where information for specific pairs of identifiable locations is not available, the facility may derive movement time information based on actual movement times for related location pairs. The generated map can be used as part of a computer application for tasks such as scheduling the picking of items, evaluating employee performance, organizing the storage of items in the warehouse, and other uses.

49 Claims, 9 Drawing Sheets

Movement Time Map 100

| | Location A | Location B | Location C | Location D | Location E | Location F | Location G | Location H | Location I | Location J |
|---|---|---|---|---|---|---|---|---|---|---|
| Location A | 0.5 | 12 | 8 | 31 | 7 | 3 | 5 | 5 | 2 | 18 |
| Location B | 12 | 1 | 4 | 11 | 12 | 5 | 1 | 22 | 3 | 4 |
| Location C | 8 | 4 | 2 | 7 | 9 | 13 | 20 | 2 | 8 | 2 |
| Location D | 31 | 11 | 7 | 1 | 26 | 15 | 25 | 1 | 2 | 40 |
| Location E | 7 | 12 | 9 | 26 | 0.5 | 6 | 11 | 7 | 11 | 5 |
| Location F | 3 | 5 | 13 | 15 | 6 | 0.5 | 55 | 3 | 12 | 19 |
| Location G | 5 | 1 | 20 | 25 | 11 | 55 | 1 | 8 | 3 | 9 |
| Location H | 5 | 22 | 2 | 1 | 7 | 3 | 8 | 2 | 6 | 2 |
| Location I | 2 | 3 | 8 | 2 | 11 | 12 | 3 | 6 | 1 | 31 |
| Location J | 18 | 4 | 2 | 40 | 5 | 19 | 9 | 2 | 31 | 3 |

*FIG. 1*

TIME-BASED WAREHOUSE MOVEMENT MAPS

TECHNICAL FIELD

The following disclosure relates generally to representing locations and location-related information in a distribution warehouse, or other distribution setting, such as by automatically generating and using maps based on movement times between locations.

BACKGROUND

As an alternative to purchasing merchandise in person at a physical store, shoppers often remotely place orders for merchandise to be delivered. Customers may place such remote orders by a variety of means, such as by making a telephone call to a merchant or interacting with a merchant's web site.

An order generally identifies one or more items and specifies delivery information that is used to ship one or more shipments containing the ordered items. Each shipment is typically delivered from a distribution center or warehouse. To fulfill shipments, employees working at the warehouse manually retrieve items from storage locations within the warehouse, such as particular bins or shelves. This process is sometimes referred to as "picking," the employees performing the picking may be referred to as "pickers," and the retrieval items may be referred to as "picked items." In large distribution centers or warehouses, picked items are often placed in totes and may be conveyed (e.g., on conveyor belts) to a sorting station that collects the items needed for each shipment.

Distribution centers and warehouses can be quite large and may rely on a substantial workforce of pickers to fulfill orders in a timely way. In distribution centers containing a large number of items, items may be stored using distinct bins or storage locations. Keeping track of such bins or locations may be a complex process. While some distribution centers may use spatially-oriented maps to show points of interest in the warehouse relative to each other, such maps are difficult to create, use, and maintain, especially when portraying a large number of uniquely identifiable locations. For example, the warehouse may need to hire industrial engineers to come in and design the initial map. These engineers may then need to revisit the warehouse periodically to update the map as the warehouse changes.

More generally, prior techniques for mapping warehouses do not effectively handle situations with a large number of items in locations that can frequently change, nor do they handle variations and changes to locations in an automated manner. Prior techniques also fail to address changes within the warehouse, such as changes in the layout and use of the warehouse, including structural changes. Examples of changes in warehouse use might include safety-related changes (e.g., a prohibition on taking a certain dangerous path between two locations), maintenance- or construction-related changes (e.g., closing/reopening a stairway), and changes provided by new transportation opportunities (e.g., faster or more maneuverable vehicles). Thus, it would be beneficial to provide automated techniques for determining information about relative locations in a warehouse, particularly in environments where locations and relationships in the warehouse change over time.

BRIEF DESCRIPTION OF THE DRAWINGS

FIG. 1 illustrates an example of a movement time warehouse map in one embodiment.

DETAILED DESCRIPTION

I. Overview

Figure 2:
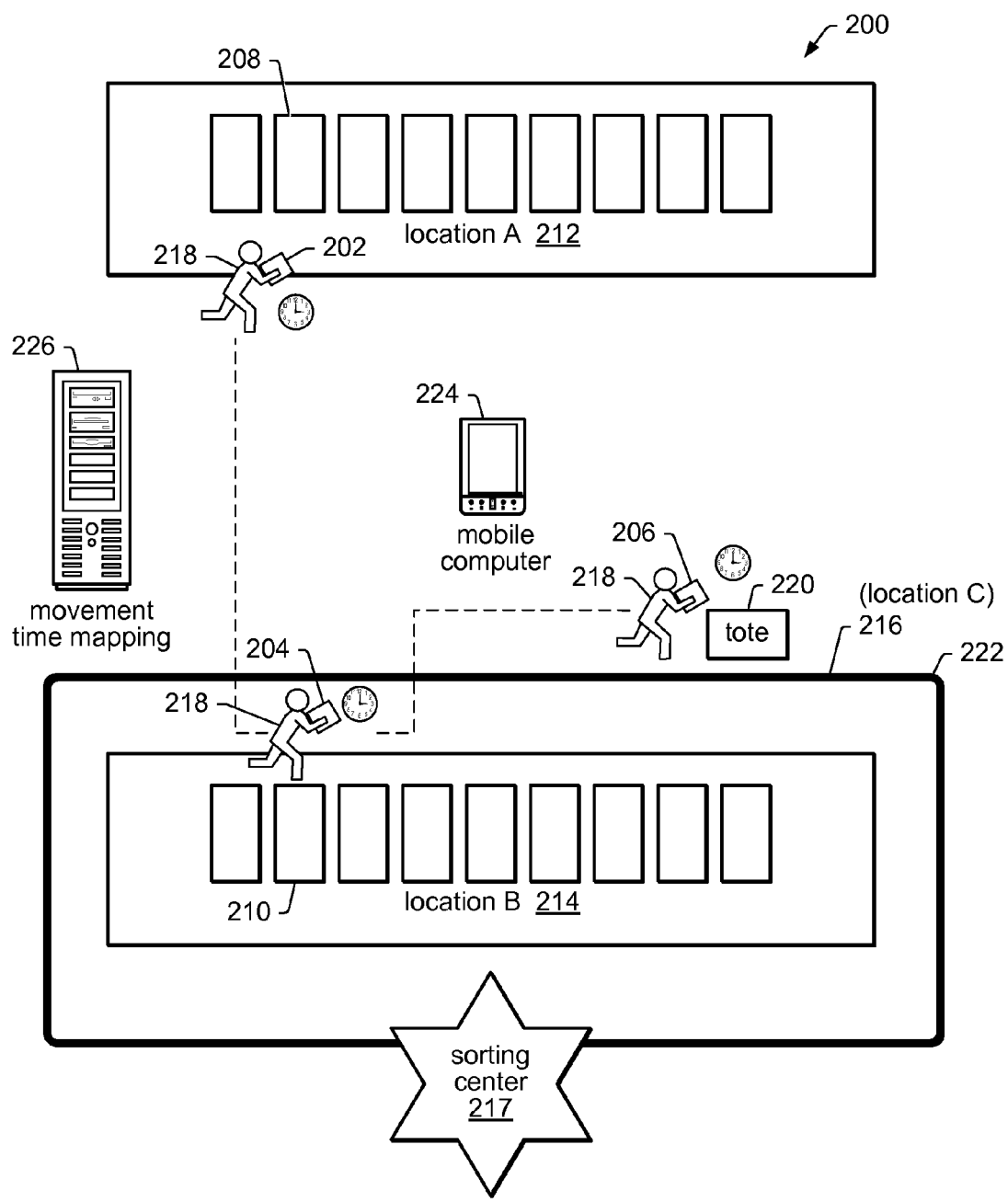
FIG. 2 is a schematic drawing showing an example of an infrastructure in which a movement time mapping facility operates in one embodiment.

A movement time mapping facility is described that is directed to representing aspects of physical space in a distribution center or warehouse without the use of a spatially oriented map. Using movement time data, the movement time mapping facility explicitly represents the relative distance between pairs of defined locations in the warehouse or distribution facility. In some embodiments, movement times between two locations are based on empirical data. The empirical data may result from, for example, tracking mobile elements as they move throughout the production/distribution environment. Examples of such mobile elements may include workers "picking" items from a series of locations, a person moving between locations riding on a forklift, a tote moving along a conveyor network, a truck moving from one distribution center to another, an unmanned transportation vehicle, etc.

By basing the mapping of the warehouse on movement time, the movement time mapping facility provides a self-healing and nonintrusive source of relative location information. For example, in some embodiments the movement time mapping facility may implement self-healing capabilities by continuing to collect movement time information over an extended period of time and updating less current information in the movement time map. In addition, the movement time mapping facility alleviates the need for manual development and maintenance of spatial maps for a warehouse. The movement time mapping facility is also flexible in that it may be used to provide information regarding a large number of locations (e.g., 50,000 or more) that may change relative to each other over time. In addition, in some embodiments the movement time mapping facility need not collect information for all the location pairs in a warehouse. Instead, the movement time mapping facility may, in some embodiments, statistically estimate movement time data based on related empirical data. It may also derive movement time data by other means (e.g., data interpolation).

Once a movement time map defining locations within the warehouse is determined, the movement time map may have a variety of uses in various embodiments. For example, the map may allow warehouse administrators to determine efficient ways to retrieve or store items in a large warehouse (e.g., for use as part of an automated pick routing/scheduling process). When incorporated into a computer application, the movement time map may facilitate configuring a path and a schedule for retrieving one or more items stored at various locations in a large distribution warehouse, such as in a manner to minimize the time needed to pick the items. The movement time map may also facilitate the retrieval of items for a number of purposes other than picking items off of shelves or out of bins for the purpose of order fulfillment. For example, the movement time map may facilitate scheduling routes or evaluating labor used in "replenishment" activities, which may include pulling items off shelves in preparation for moving them to different parts of the building so that they be more efficiently picked or so that they may be returned to a vendor or otherwise disposed of.

The movement time maps may also be used in evaluating movement between bins for the purpose of inspecting the contents of the bins, such as for financial audits or to acquire data (e.g., photos or weights or dimensions) about the product within the bins. The movement time maps may also assist in the process of putting items into bins at specific storage locations, sometimes referred to as "directed putaway." In addition, the movement time map can be used for other purposes, such as developing labor standards (e.g., determining a reasonable number of picks per hour rate) and evaluating the performance of workers (e.g., rating workers on how efficiently they move through the warehouse).

Some additional uses of the movement time maps include evaluating an employee's productivity by providing an unambiguous expected time for a very specific route; routing picks or distributing picks; scheduling picks; creating alternative pick schedules; grouping locations into various categories for increased efficiency in the warehouse; and creating warehouse management simulations for predicting the effectiveness of different warehouse management schemes.

Further uses of the movement time maps, in conjunction with the movement time mapping facility or other computerized systems, may include scheduling of totes or other containers moving on automated conveyors; detecting jams on conveyors by monitoring unusual deviations of observed movement times from expected movement times; routing, scheduling, monitoring, and evaluating of replenishment workers (on foot or using automated transportation equipment); distributing items from centralized locations to individual storage locations, etc.

FIG. 1 is an example of a time map table 100 generated by an embodiment of the movement time mapping facility. The time map table 100 is represented by a collection of defined locations (e.g., locations A–J) arranged in an n×n matrix, with each location having its own row and its own column. In some embodiments, the movement time mapping facility provides an estimated movement time lookup feature, which, given two locations (e.g., locations F and D) finds an estimated movement time between those two locations (e.g., 15 seconds). In some embodiments, the movement time may be an average movement time (e.g., determined by using a percentile technique for empirical data points) or some other movement time measure (e.g., best expected, worse case, etc.), and may further, in some embodiments, include additional information (e.g., a statistical measure related to the movement time value, such as a standard deviation). In some embodiments, the number of records that the movement time mapping facility stores can be reduced by treating the movement times between two locations reflexively (e.g., the movement time from A to B is assumed to be the same as the movement time from B to A).

II. System Architecture

FIG. 2 is a schematic drawing showing a typical distribution center or warehouse facility 200 in which a movement time mapping facility 226 operates in one embodiment. While a distribution center having particular elements arranged in a particular layout is shown in FIG. 2, those skilled in the art will appreciate that the movement time mapping facility 226 may readily be used in distribution centers having other elements and/or layouts.

FIG. 2 shows items, such as items 202, 204, and 206, that initially reside in storage areas, such as storage bins 208 and 210. Such bins or storage areas may be grouped into locations, such as location A 212 and location B 214, as described in more detail below with respect to FIG. 8. In general, the warehouse 200 may have many defined locations, each having its own defined storage areas or bins. In addition to item storage areas, other types of locations may exist, including locations associated with conveyor belts (location C) 216, sorting centers 217, or other features of the warehouse. Further, in some embodiments, multiple locations may be gathered together into larger pick areas. Alternatively, in other embodiments, there may be a one-to-one correspondence between locations and storage areas or bins.

In the normal course of carrying out work tasks such as picking, storing, or moving items, such as items 202, 204, and 206, a picker 218 moves among locations (212, 214, 216) in the warehouse. For example, the picker 218 may move from location A 212 to location B 214 to location C 216, accomplishing tasks such as removing items from bins and placing items into totes, such as tote 220, and/or conveyor belts, such as conveyor belt 222. In some embodiments, the picker 218 picks one item at a time; in other embodiments, the picker picks two or more items at a time or in sequence.

In some embodiments, the picker 218 may use a mobile computing device 224 to receive picking instructions on the location of each piece of work, and may also use the mobile computing device to perform scanning to track the timing of arriving at locations or picking items. For example, when an item is removed from a storage area or, alternatively, placed on the conveyer belt 222, the picker 218 may scan a bar code on the item, scan a barcode associated with the physical location, or otherwise interact with a movement time mapping facility 226 in such a way that the picker's current probable location may be known. In some embodiments, the movement time mapping facility 226 can determine the current probable location of the picker 218 without the picker having to perform an explicit action (e.g., a scanning event). For example, the movement time mapping facility 226 or an associated tracking system may use a passive RFID scanner sensing the presence of an RFID attached to the picker 218 and then report on the presence of the picker at a certain location associated with the RFID scanner. Each time the picker 218 is tracked at a particular location, a record containing a time stamp may be created, as described in more detail with respect to FIG. 3.

Once collected, the movement time mapping facility 226 then analyzes data associated with such movement (or nonmovement) events to generate movement time maps that provide information about the layout of the warehouse in terms of time.

Figure 3:
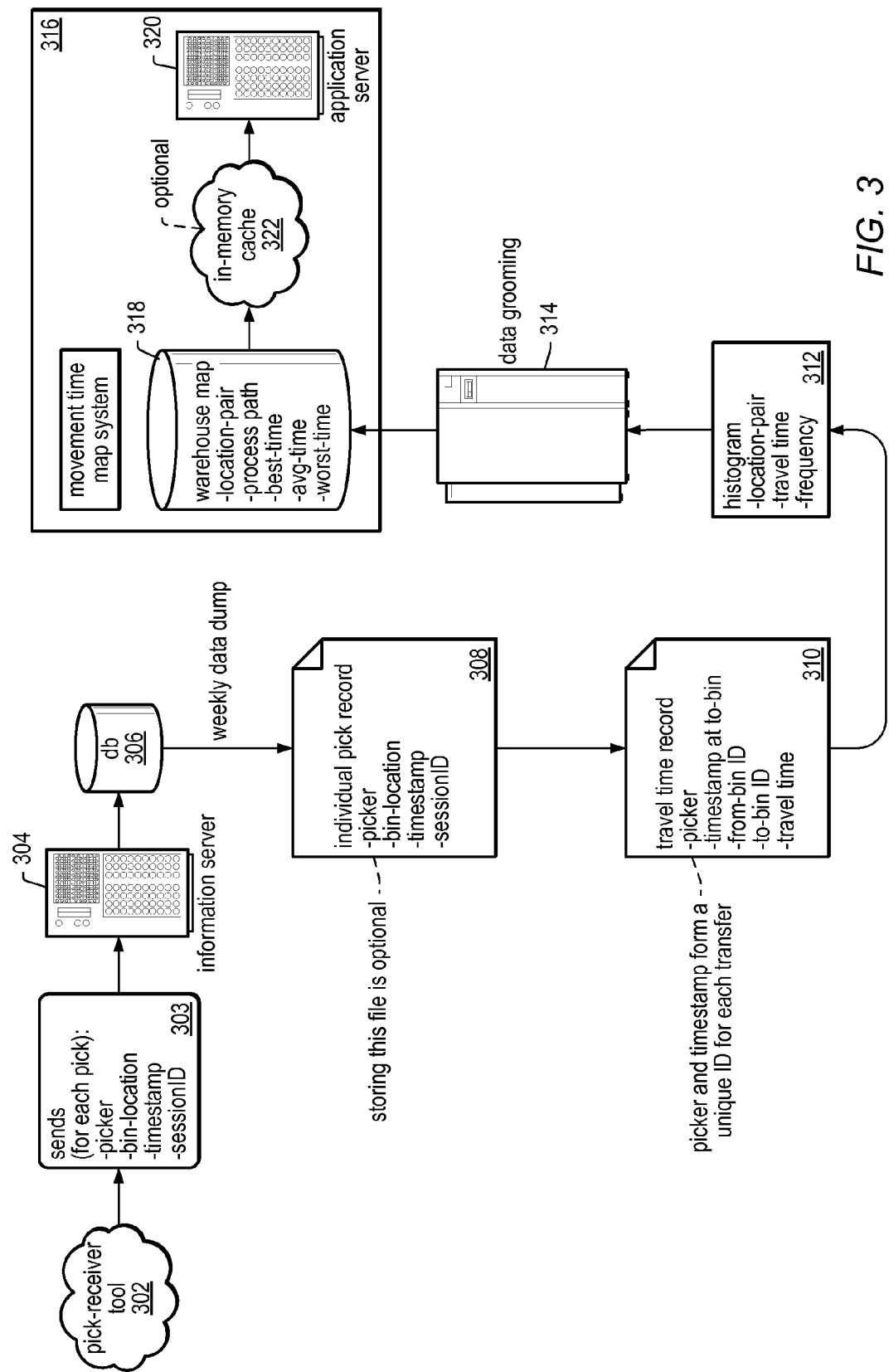
FIG. 3 is a network diagram illustrating the flow of information through components of the movement time mapping facility of FIG. 2.

FIG. 3 is a network diagram showing the flow of information through components of an embodiment of the movement time mapping facility 226 of FIG. 2. In general, via one or more of its components, the movement time mapping facility generates a series of ID/location/time observation records. Many techniques and associated devices can be used to gather the information used to generate such records, including fixed or mobile computer terminals, handheld computers, RFIDs passively read by scanners or active RFIDs pinged by antennae, button presses on pick-to-light devices, barcode scanners, light beams with sensors to tell when the beam is broken, GPS devices, motion detectors, photoeyes, image processing systems looking at photos or digital video of a region to determine position of a mobile element, etc. The movement time mapping facility may include one or more information servers or databases to store collected and observed information. The movement time mapping facility may generate location-to-location elapsed time based on relevant generated records (e.g., records relating to select IDs). Alternatively, the movement time mapping facility may collect location-to-location elapsed time as raw data. The movement time mapping facility may perform statistical analysis of the relevant records for each possible location pair.

In the illustrated embodiment, the movement time mapping facility includes a software application 302 (e.g., a pick receiver tool) that collects information for various actions performed by a mobile element (e.g., a picker). In some embodiments, the software application 302 is implemented, at least in part, on a mobile device carried by the picker, such as the mobile device 224 illustrated in FIG. 2. The mobile device can tell the picker which item to pick next, where to go to pick the item (e.g., location and path), and the precise location of the next item (e.g., storage bin number). When the picker reaches the item, the picker can scan the item or otherwise register his or her arrival at the location using the mobile device. After the arrival event occurs, the pick receiver tool sends information about the pick to an information server 304. As shown in block 303, this information about the pick in this embodiment includes an indication of the picker, an indication of the bin from which the item was picked, a time stamp providing an indication of the current time when the item was picked, a session ID, etc. In some embodiments, the session ID allows the movement time mapping facility to use the information from consecutive picks to create records containing the time between picks. The movement time mapping facility may also use the ID information to determine the type of mobile element being tracked (e.g., advanced picker, beginning picker, stower, etc.). This information may be especially useful where different maps are used for different types of mobile elements (e.g., the map for a beginning picker may be different than one for an advanced picker, and a stower's map may be different than a picker's map).

The information server 304 may be in communication with a database 306 that stores information about picks. Files of records for individual picks (e.g., via a weekly data dump) may then be produced from the database 306 as shown in file 308, and/or files showing a movement time record 310 consisting of information for two consecutive picks may similarly be produced, including a movement time between the two locations where the items associated with the consecutive picks were located. The movement time mapping facility may convert the information in these files or records into a histogram 312. The histogram 312 may consist of one or more movement time data points for a specified pair of locations. Accordingly, the histogram 312 may be based on information regarding the location pair, an indication of one or more movement times between the location pairs, and a count of the number of times a specific value for the movement time between the two locations was observed.

The information from the histogram 312, and other raw information, may be groomed using a data grooming component 314. Additional details regarding data grooming are discussed below. The data, once groomed to be useful, is inputted into a movement time map system 316, where it is configured into a map that can be used in various applications, also discussed in more detail below. In the illustrated embodiment, the movement time data is stored in a warehouse map database 318 and is accessed by an application server 320 (or by the software application 302). In the illustrated embodiment, the data stored in the warehouse map database 318 includes location pair information, process path information, and best, average, and worst movement time data for each pair of locations. An optional in-memory cache 322 may provide more efficient access to the movement time map data.

Figure 4:
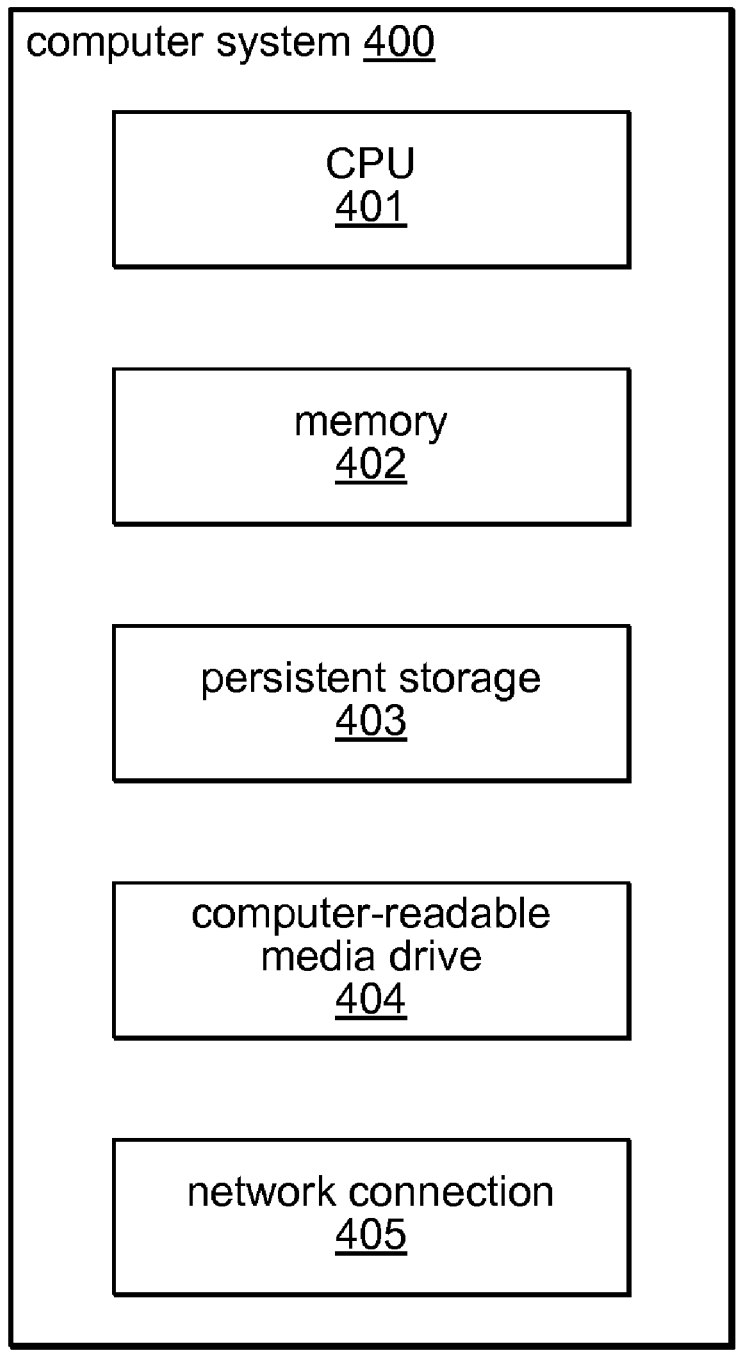
FIG. 4 is a block diagram illustrating an embodiment of a computing system suitable for executing an embodiment of the movement time mapping facility.

FIG. 4 is a block diagram showing some of the components typically incorporated in at least some of the computer systems and other devices on which an embodiment of the movement time mapping facility executes. These computer systems and devices 400 may include one or more central processing units ("CPUs") 401 for executing computer programs; a computer memory 402 for storing programs and data—including data structures—while they are being used; a persistent storage device 403, such as a hard drive, for persistently storing programs and data; a computer-readable media drive 404, such as a CD-ROM drive, for reading programs and data stored on a computer-readable medium; and a network connection 405 for connecting the computer system to other computer systems, such as via the Internet, to exchange programs and/or data—including data structures. While computer systems configured as described above are typically used to support the operation of the movement time mapping facility, one of ordinary skill in the art will appreciate that the movement time mapping facility may be implemented using devices of various types and configurations, and having various components.

Those skilled in the art will appreciate that the illustrated computing and warehouse systems are merely illustrative and are not intended to limit the scope of the present invention. For example, the computing system 400 may be connected to other devices that are not illustrated, including through one or more networks such as the Internet. More generally, the "server" and other computing systems may comprise any combination of hardware or software that can interact in the manners described, including computers, network devices, internet appliances, PDAs, wireless phones, pagers, electronic organizers, television-based systems and various other consumer products that include inter-communication capabilities. In addition, the functionality provided by the movement time mapping facility component illustrated in FIGS. 2 and 3 may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or in storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the movement time mapping facility components or data structures may also be stored (e.g., as instructions or structured data) on a computer-readable medium, such as a hard disk, a memory, a network, or a portable article to be read by an appropriate drive. The movement time mapping facility components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

III. Gathering of Empirical Data

In some embodiments, the movement time mapping facility gathers data during normal warehouse operations. The gathered data may reflect activities that occurred at each bin, as well as data reflecting actual movement time "between the bins" (e.g., the time to complete one pick beginning at a remote location). In addition, data reflecting lack of movement may also be gathered, as shown in the central diagonal row of the table of FIG. 1. For example, two picks in a row at an identical location helps define the time necessary to physically pick an object, not counting the time necessary to move from place to place. The movement time mapping facility may then use this stationary pick information as a constant to be subtracted from every location-to-location observation, providing a much better estimate of the actual travel time.

Figure 5:
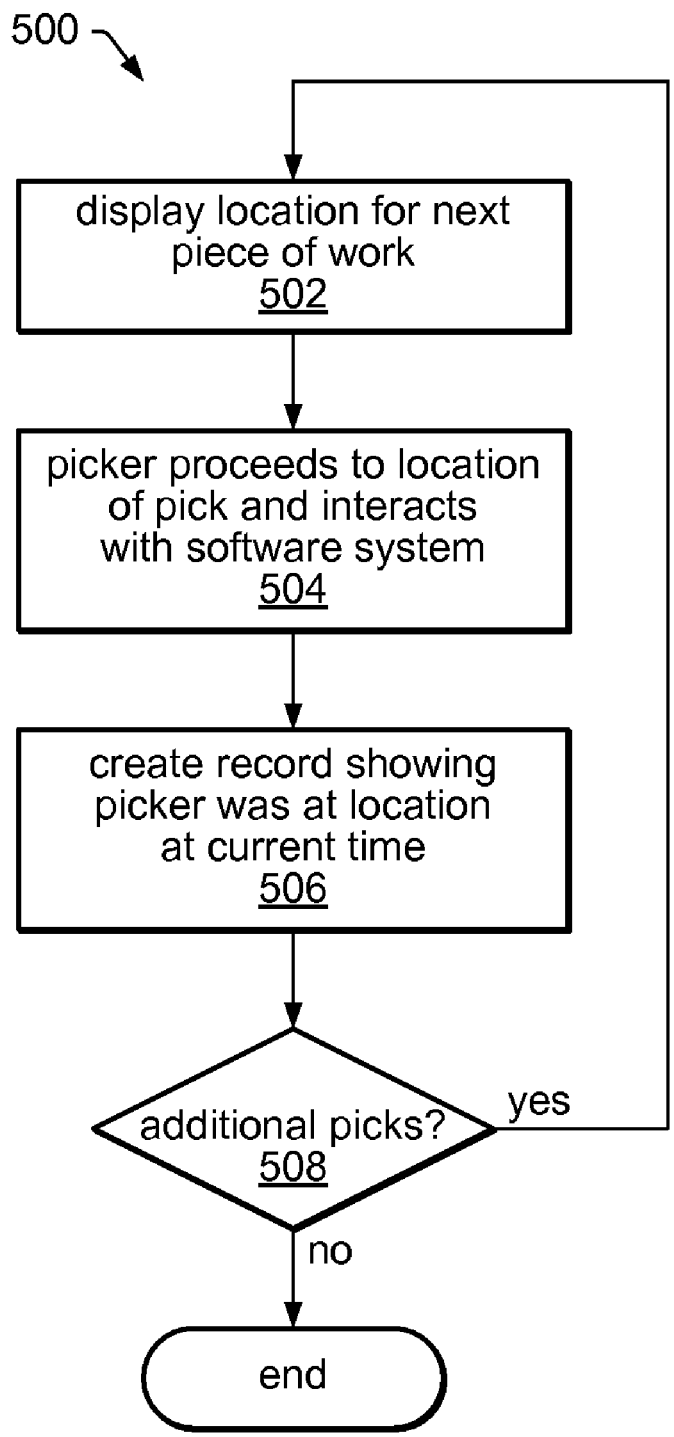
FIG. 5 is a flow diagram of an embodiment of a routine used in generating records for creating movement time maps.

FIG. 5 is a flow diagram illustrating a routine 500 for gathering of empirical movement time information between two locations in a warehouse. In some embodiments, the routine 500 is performed, at least in part, by the movement time mapping facility's pick receiver tool. When implemented as a computer software application, several instances of the pick receiver tool may be running at one time so that data can be gathered for multiple picks that are taking place simultaneously. At block 502 the routine 500 displays a pick on a mobile device of the picker. The picker then knows to perform this pick at a specified first location. At block 504, the picker proceeds to perform the first pick at the first location and performs a scan of the picked item, indicating to the routine 500 that the item has been picked. At block 506 the routine creates a pick record for the first pick. At decision block 508, if there are additional picks to perform, the routine loops back to block 502. Otherwise, if there are no additional picks to perform the routine ends.

Figure 6:
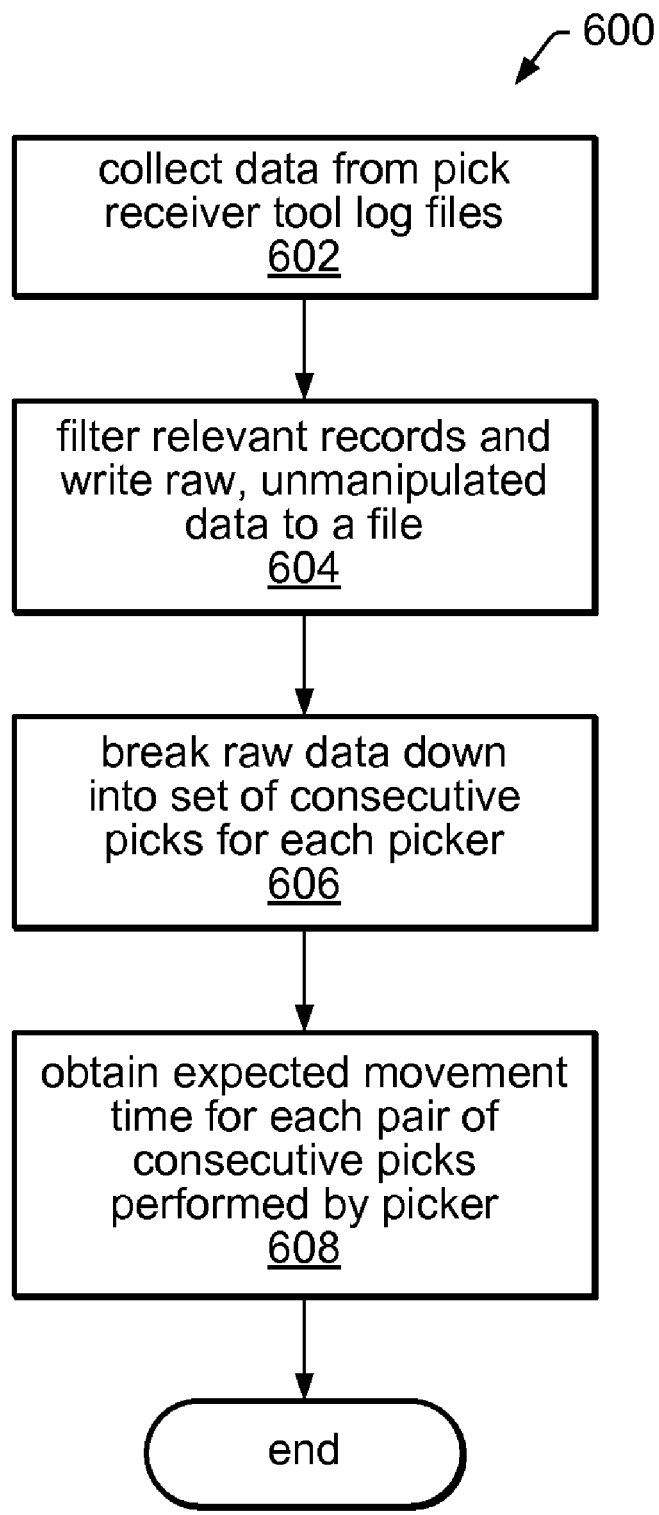
FIG. 6 is a flow diagram of an embodiment of a data manipulation routine used in generating movement time maps.

The movement time mapping facility can assimilate raw data, such as the pick records described with respect to FIG. 5, in various ways, such as log-file parsing, database record keeping, or some other technique or combination of techniques. FIG. 6 is a flow diagram illustrating a routine 600 for log-file parsing, performed by, for example, a Perl script running at the movement time mapping facility. At block 602 the routine 600 collects a full day's worth of data from the log-files of all the available instances of the pick receiver tool. At block 604 the routine 600 then filters out the relevant records and writes the raw, unmanipulated data to a file. With the log-file parsing technique, the raw pick data may include information identifying a picker, a pick location, and a time stamp for each pick. At block 606, the routine 600 then breaks this information down into a set of consecutive picks for each individual picker. At block 608, the routine 600 obtains the expected movement time data for each observed bin pair. For example, the movement time mapping facility may provide a Perl script that reads and updates a histogram of observed movement times for each observed pair. In some embodiments, the raw log-file data, as well as the histogram, is stored in a flat file.

Those skilled in the art will also appreciate that, in some embodiments, the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality, respectively, or when the amount of functionality that is provided is altered. In addition, while various operations may be illustrated as being performed in a particular manner (e.g., in serial or in parallel) and/or in a particular order, those skilled in the art will appreciate that, in other embodiments, the operations may be performed in other orders and in other manners.

The movement time mapping facility may also assimilate raw data using database record keeping, where each pick results in the movement time mapping facility creating a database entry in a table. The movement time mapping facility then uses a database access tool that reads the pick data from the database. The database entry may be stored in a table with attributes such as a time stamp, a first location, a second location, and a movement time. Assuming all possible locations are known, the first and second location attributes can be combined to form a location pair attribute (e.g., by appending the identifying strings together and then replacing the compound key by a trivial hash function).

In embodiments where the movement time mapping facility continues to collect movement time data on an ongoing or periodic basis, estimates for "best," "average," and "worst" movement times may be available for any given pair of locations. In one example, these estimates are based on the 100 most recent movement events. By continuing to track movement time data on an ongoing basis, the movement time mapping facility can react to conditions or layout changes in the warehouse or distribution center by intentionally throwing away data points that predate the new conditions or layout.

The movement time mapping facility may store large amounts of data, depending on the number of uniquely identifiable locations in the map. In one embodiment, the warehouse or distribution center has 10,000 shelving units (called "bays"), with each bay holding several dozen individually identifiable item-storing bins. If each bay is treated as a location, and the movement time mapping facility stores 100 data points per each location pair, the database table may become very large, growing to $10^{10}$ (=100*10000*10000=10 billion) data sets. Assuming 100 bytes per record, this corresponds to 1 TB of storage. However, both time stamp and location pair attributes are easily indexed, so this size data set and even larger data sets are quite manageable.

In addition, to further limit the amount of data storage space needed, the movement time mapping facility may not collect data for every possible pair of bins in the warehouse, and not even for every possible pair of bays. Instead, groups of densely packed bays or bins (e.g., 20-foot blocks) may be grouped into a single location for purposes of generating movement time data. Where this technique is used, the expected data sets can be much smaller (e.g., 1 million data sets for a warehouse or distribution center with 10,000 bays (100*100*100 million), where each coarse-grained location contains 100 actual bays, which corresponds to about 100 MB).

Figure 7:
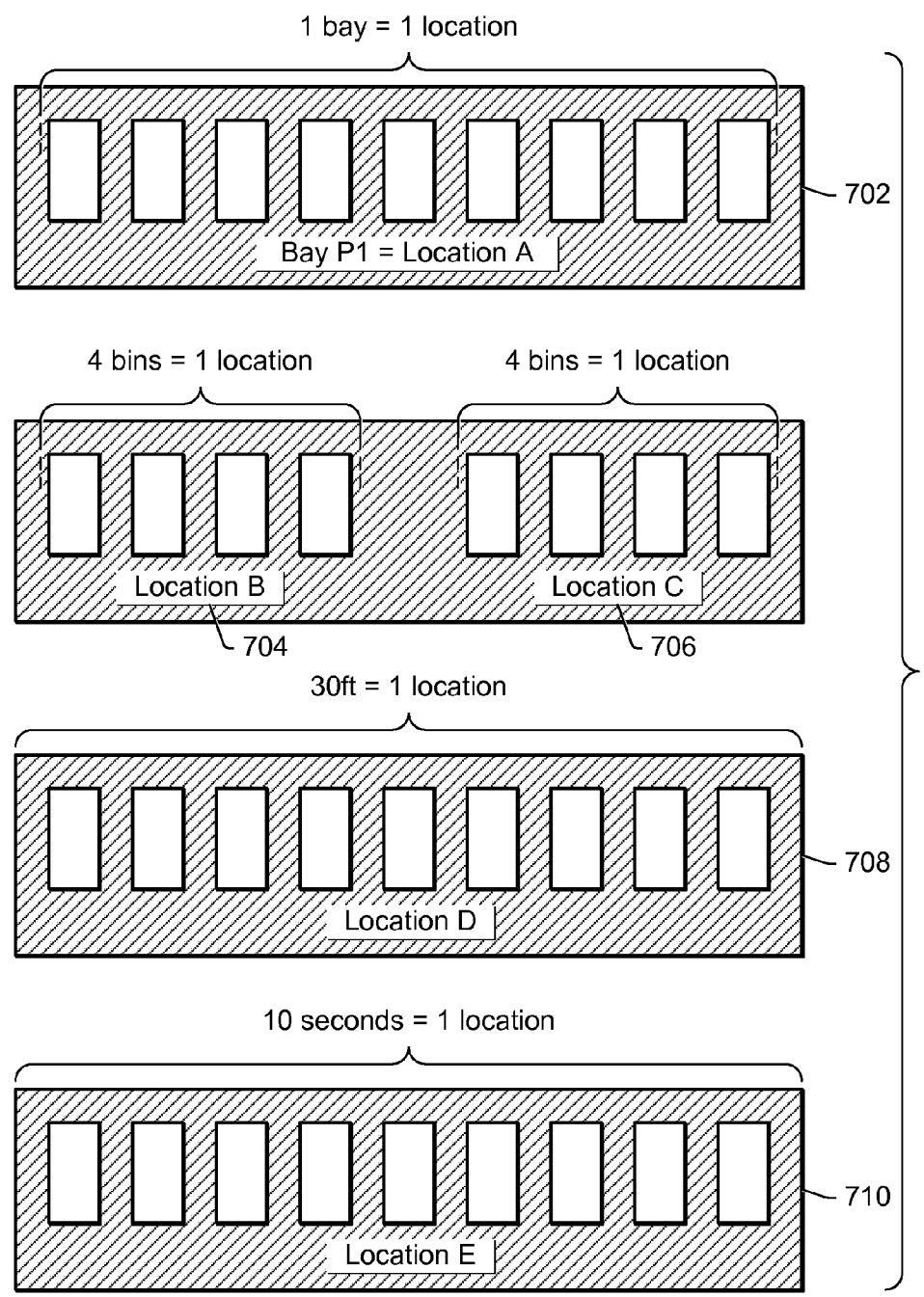
FIG. 7 is a block diagram illustrating the determination of locations between which the movement time mapping facility tracks movement times.

The meaning of a location can thus vary from embodiment to embodiment. FIG. 7 is a block diagram showing multiple configurations for locations in the warehouse. In some embodiments, a location comprises a group of bins related by proximity. Once implemented, the movement time warehouse map provides expected travel times between such locations. There are several ways in which locations can be mapped to real bins. One technique for mapping locations to real bins is to define a location in terms of a bay (e.g., a three-foot-wide shelf holding several bins). In systems where the bin's ID is provided for each pick and where the ID itself contains information about relative location, the location can be derived from the ID (e.g., Bin P-1-A1A1 is in a location with ID P-1-A1). In FIG. 7, location A 702 corresponds to a bay.

Another technique for mapping locations to real bins is to define the location as a set number of consecutive bins (e.g., 4 bins=1 location). With this system, each location will vary in terms of size, depending on the type of storage bin. As shown in FIG. 7, location B 704 consists of 4 consecutive bins, and location C 706 also consists of 4 consecutive bins Yet another technique for mapping locations to real bins is to define the location as a set of bins that spans or covers a certain length of a warehouse (e.g., bins included in 12 feet of pick path=1 location). Referring to FIG. 7, a location span of 30 feet, forming location D 708, illustrates this concept.

Another technique for mapping locations to real bins is to select locations such that traversing them using the typical mode of transportation (e.g., by foot, by warehouse vehicle, etc.) takes a set amount of time. In FIG. 7, location E 710 illustrates this concept.

The concept of locations provides a decoupling between the actual warehouse layout and the warehouse map software/system, which is described in more detail below. Locations allow the relationship between bins and locations to be automatically or manually configured and tailored as needed, even if the movement time mapping facility employs an automatic algorithm most of the time. Coarser-grained locations may be useful in that they reduce the storage required at run time and that required for the storage of historical data and, given a finite amount of raw data, they provide a larger number of observations for each location pair, when compared with finer-grained locations. In most cases, a location-to-location time estimate supplied by the map may have an associated margin of error. If the time required to move from one extreme of a coarse-grained location to another extreme is significantly less than the margin of error, then the level of precision in location definition is too high, and locations can be defined even more coarsely without loss of information accuracy.

IV. Data Grooming to Create Movement Time Maps

The movement time mapping facility may perform further assimilation or grooming of the movement time data after it is stored in files, database tables, or histograms. For example, the stored movement time data may still be subject to statistical fluctuations and may be further refined for meaningful use. The grooming of this data may include, for example, data selection, data interpolation, data smoothing, and data monitoring. Many of these activities may be performed in batch mode.

Figure 8:
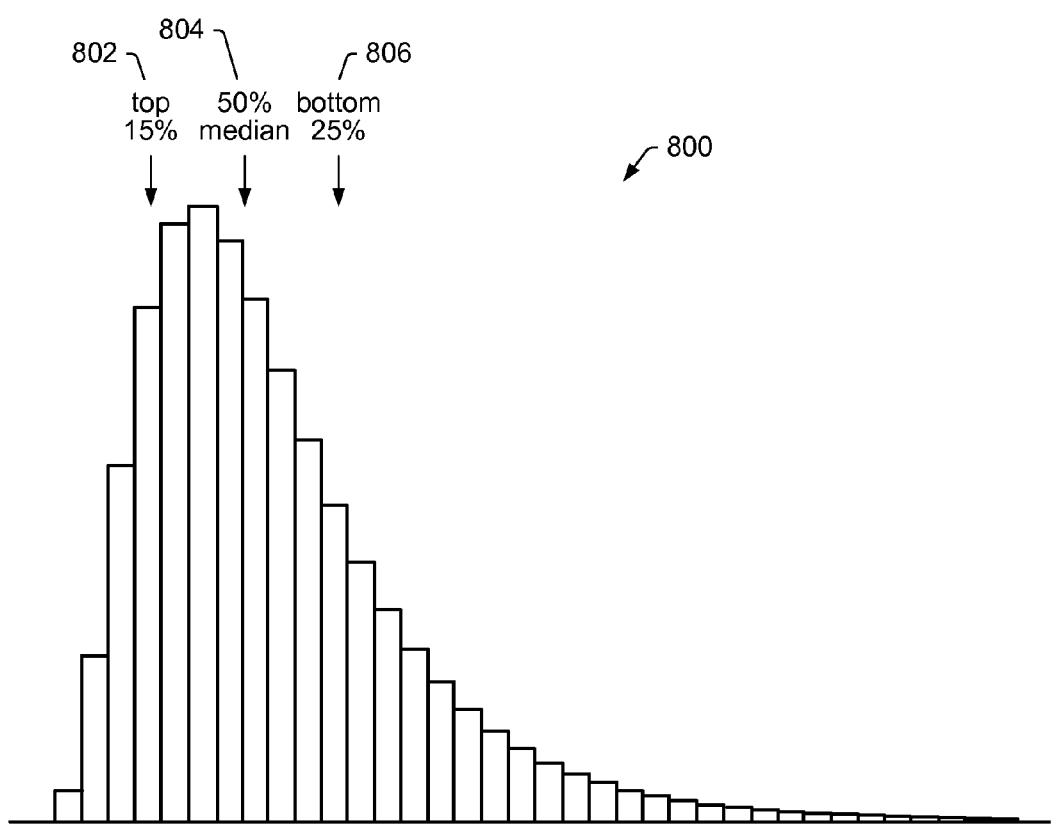
FIG. 8 is a histogram graph illustrating a collection of movement time data points for a pair of locations.

With data selection, a set of recorded pick data for each location pair provides a noisy histogram of observed movement times. FIG. 8 shows an example of histogram data 800 for a location pair. The histogram 800 shows a collection of movement time data for the location pair, with movement time being depicted on the horizontal axis and the frequency that this movement time was observed on the vertical axis. As shown, the distribution of points within this histogram is typically asymmetrical with frequently occurring outlying movement times (e.g., excessively long movement time). The average (i.e., mean) may, therefore, be a very poor measure of the distribution. Accordingly, the movement time mapping facility may use percentiles to provide a more accurate measure of the data. For example, the movement time mapping facility may select one or more target times to gauge movement times occurring in the distribution. In one embodiment the movement time mapping facility selects a "best expected" movement time 802 by determining the top percentage of the fastest picks (e.g., only 15% of all picks for that location pair are completed in less time than the best expected movement time 802). Likewise, the fiftieth percentile (i.e., median) is a fair measure of the "average" movement time 804 for that pair of locations, and the slower twenty-fifth percentile is a measure of the "worst acceptable" movement time 806. Different percentiles may have different uses, depending on the context. For example, the median value may be a useful number to predict the time required for scheduling purposes; the top thirtieth percentile may be a more appropriate number to set a goal above which workers will receive recognition or a reward; and the bottom thirtieth percentile may be an appropriate goal to set for inexperienced workers. Using percentiles makes it unnecessary to arbitrarily reject outliers.

Because pickers may visit some location pairs rarely, if ever, the movement time mapping facility may produce histograms having no or relatively few data points. The estimates for expected movement time based on histograms having very small sets of data points may not be as reliable as those based on histograms with larger sets of data points. Nonetheless, such histograms may be useful for deriving more reliable information, for example, as described below.

The warehouse may be divided into several pick areas, each containing a set of locations. To maximize efficiency, a picker is seldom assigned a sequence of picks that causes him or her to leave one particular pick area. To further maximize efficiency, sequential picks often occur within an even smaller portion of the pick area. Accordingly, empirical movement time information for more widely spaced location pairs may not be available. To make up for such gaps in empirical data, the movement time mapping facility may use data extrapolation techniques to derive movement time data.

Figure 9:
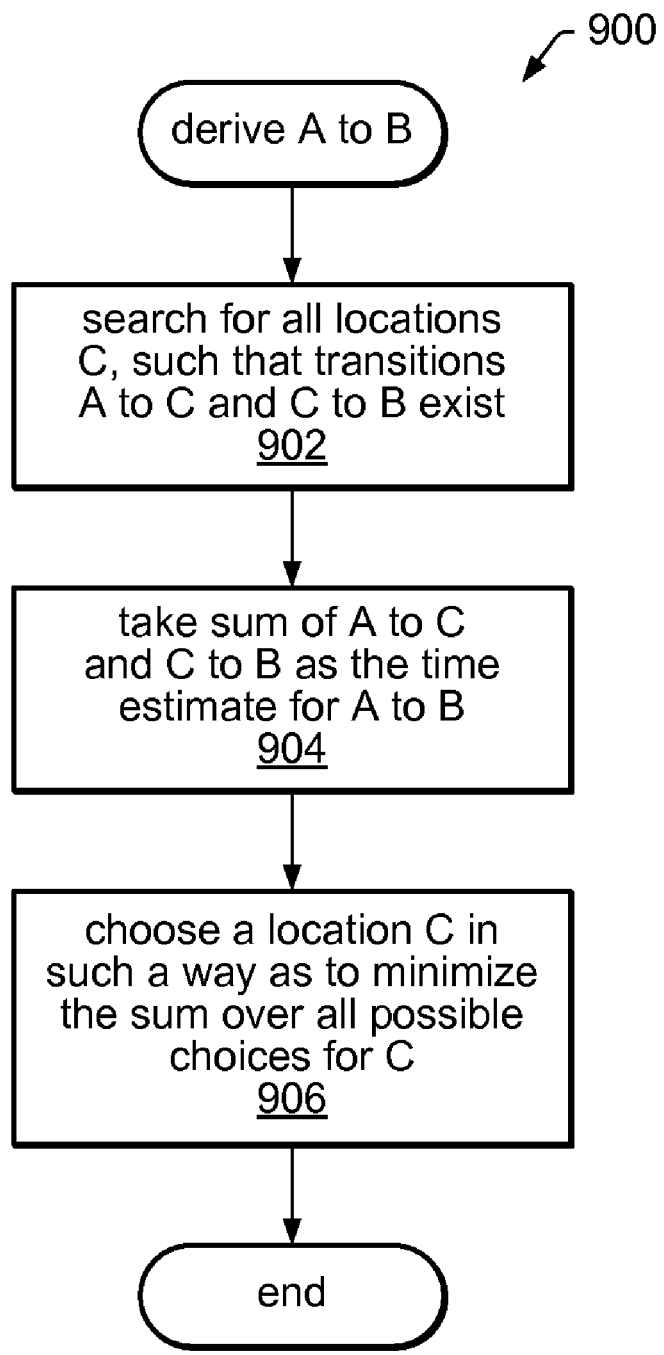
FIG. 9 is a flow diagram showing a routine for determining estimated movement time data between a pair of locations for which empirical movement time data is not available.

Accordingly, if no data is available for A→B, the movement time mapping facility searches for movement events involving an intermediary location (e.g., A→C→B). An example of this process is illustrated in FIG. 9, which provides an example of an interpolation routine 900 for determining an estimated movement time between two locations for which empirical data is not available. At block 902, if empirical data for the A→B movement event is not available, the routine 900 searches for all locations C, such that movement events A→C and C→B exist. At block 904, the routine 900 takes the sum of both movement event times as the time estimate for A→B. At block 906, the routine 900 chooses the location C in such a way as to minimize this sum over all possible choices for C.

The movement time mapping facility may also extrapolate movement time data using more than one intermediary movement events, e.g., A→C→D→B. This technique is similar to the technique described above for a single intermediary location but allows for two or more intermediate locations instead of only one. Using data points associated with single, double, and triple intermediary locations typically covers movement events between almost all possible location pairs. Furthermore, any of the extrapolation mechanisms may be repeated to successively fill in more of the missing data. To fill isolated gaps, the movement time mapping facility may generate an average of all adjacent movement events for which data exists.

Other interpolation techniques may be utilized, including a smearing out technique where the movement time mapping facility creates movement time estimates by averaging adjacent location pairs; a function-based interpolation technique where the movement time mapping facility replaces the available sets of empirical data with an analytic function that the movement time mapping facility can compute at arbitrary points (this technique replaces a discrete transition matrix of empirical data with a function having two variables); a multidimensional interpolation technique where the interpolation function is reduced or fit in one dimension; and a seeding technique where the movement time mapping facility receives the missing data using data acquired by sending pickers out to perform time scans for predetermined pairs of locations where empirical data from normal warehouse operations is otherwise not available.

The seeding technique discussed above can be especially useful because it allows the movement time mapping facility to establish a regular two-dimensional grid of observed data points to fit a function. The movement time mapping facility can then obtain data for sparsely populated transitions, such as between pick areas, and obtain data on location pairs that are of special interest (e.g., distances between neighboring pick areas).

Once interpolation is complete, the movement time mapping facility may make a final pass and perform a "smoothing" step to look for unreasonably large time differences for closely related transitions. If there is an isolated data point that differs significantly from its neighboring data points, some embodiments of the movement time mapping facility assume it is an outlier and replace the data point using averages derived from neighboring data points.

In some embodiments, using ongoing data monitoring, the movement time mapping facility tracks and reports anomalous deviations in the observed data from the historically expected movement times. This facilitates the detection of new, quicker routes or changes to the layout of the warehouse. Such changes can include changes to the configuration of locations in the warehouse, such as the addition of new locations or space, the elimination of locations or obstacles, warehouse reorganizations, etc. Accordingly, by continuing to track movement data over time, the movement time mapping facility may provide an updated map of the warehouse, without the need for generating an entirely new map when the warehouse changes.

Those skilled in the art will appreciate that the data configurations discussed above and their associated data structures may be structured in different manners, such as by having a single data structure split into multiple data structures or by having multiple data structures consolidated into a single data structure. Similarly, in some embodiments, data structures may store more or less information than is described, such as when other data structures instead lack or include such information, respectively, or when the amount or types of information that is stored is altered.

V. Using Movement Time Maps

The movement time mapping facility may provide the results of the assimilated and manipulated movement time data to a warehouse map system or application. In some embodiments, the warehouse map system provides an application program interface (API), which, given a pair of bins, returns a measure of the expected movement time (in seconds). The API may also provide methods to find "best expected," "average," and "worst acceptable" movement times.

Once created, movement time maps of a warehouse or distribution center can have many applications. In one application, warehouse managers use movement time maps to estimate the time it takes to pick a series of items in chronological order.

Movement time maps can also be used to "rate" picking jobs, for gauging a picker's productivity and/or for purposes of scheduling picks. For example, while locations A and B may seem to be the same distance apart as locations C and D on a traditional map, the actual movement times between the two pairs of locations may vary dramatically, depending on other conditions besides relative distance, such as warehouse topography, congested areas, pathways, the configuration of locations, etc. For this reason, when compared with spatial mapping techniques, the movement time map can provide a much more realistic way to estimate movement times in the distribution center or warehouse.

The movement time maps can also be used to study movement or flow within the distribution center. For example, by having the ability to track unexpectedly low or high movement times between locations, managers can use the movement time facility to create or update predetermined pick paths for maximum warehouse efficiency. A software application can also be used that monitors movement times, compares recent times to the movement time map, and reports on unexpected discrepancies between expected and recent times. Such discrepancies can be an early warning indicator for problems such as traffic jams, broken transportation equipment, workers whose movement is impeded by exceptional circumstances, etc.

The movement time maps can also be used in the process of storing or organizing items in the warehouse, or the grouping of inventory to be picked. Pick events can consist of a scanning event that occurs when an item is picked. It is possible to use other events as events for collecting statistical information including forklift traffic, scanning that occurs at the sorting machine, etc.

The same principle (travel time prediction based on empirical travel time data) may also be applicable to the movement of totes on conveyors or replenishment workers bringing items from a central location to individual storage locations. Also, the movement time mapping facility and its associated maps may be employed for movement between multiple facilities separated by minutes or days of travel time. Once assimilated, the conveyer time map may improve the estimates of totes traveling on the conveyor system.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

We claim:

1. In a computer system, a method for generating a map establishing relative locations in a distribution warehouse configured for storing items for customer orders, the method comprising:

defining locations in the distribution warehouse, wherein the defining includes assigning an identity to each location in the distribution warehouse, so that each location in the distribution warehouse is uniquely identifiable;

tracking movement times between the locations in the distribution warehouse such that, for each pair of the locations, the tracking comprises:

assigning a picker to pick a first item at a first location and recording the picker's presence at the first location;

assigning the picker to pick a second item at a second location and recording the picker's presence at the second location;

tracking the time it takes for the picker to move between the first location and the second location, wherein the tracking includes analyzing information associated with the picker's presence at the first location and analyzing information associated with the picker's presence at the second location; and creating a record for the time it takes for the picker to move between the first location and the second location, wherein the record includes an identifier for the first location, an identifier for the second location, and an actual movement time;

generating a map of the distribution warehouse, wherein the map comprises a collection of temporal relationships between a substantial portion of the uniquely identifiable locations in the distribution warehouse, and wherein the temporal relationships are based on either actual movement times obtained from the tracking or, where an actual movement time for a pair of locations is not available, on estimated movement times derived from the actual movement times; and using the generated map to schedule future picks to occur at the distribution warehouse.

2. The method of claim 1 farther comprising:

once the map of the distribution warehouse is generated, continuing to track movement times for pairs of the uniquely identifiable locations in the distribution warehouse on an ongoing basis; and based on the continued tracking, updating the generated map of the distribution warehouse to reflect changes in movement times or changes in locations.

3. The method of claim 1 further comprising evaluating picker performance using the generated map, wherein the evaluating includes determining an expected movement time for traveling between two locations in the distribution warehouse and comparing a picker's actual movement time between the two locations with the expected movement time.

4. The method of claim 1 farther comprising generating a list of picks to be completed by a picker based on the generated map, wherein the list of picks includes a time frame for completing the picks on the list of picks and an order for completing the picks on the list of picks.

5. The method of claim 1 further comprising selecting a subset of picks from a larger pool of picks based on the generated map, wherein the subset of picks is selected to minimize the movement time when making those picks included in the subset.

6. In a computer system, a method of creating a movement time map depicting a relationship between locations in a warehouse configured for fulfilling item orders, the method comprising:

tracking the movement of workers in the warehouse so as to determine a time it takes for a worker to move between a pair of identifiable locations, each of the identifiable locations storing items for fulfilling customer orders;

based on the tracking, producing movement time records for one or more location pairs in the warehouse, wherein each one of the movement time records includes an indication of the location pair and a movement time between the location pair; and based, at least in part, on the movement time records, generating a map of the warehouse, wherein the map provides expected movement times between the one or more location pairs.

7. The method of claim 6 wherein the map is configured for use with a computer software application, and wherein the computer software application returns an expected movement time output when given two locations as input.

8. The method of claim 6 wherein the map is configured for use with a computer software application, and wherein the computer software application is used to estimate the time it takes to pick a sequence of items from specified locations in the warehouse.

9. The method of claim 6 wherein the map is configured for use with a computer software application, and wherein the computer software application is used to schedule the picking of items in the warehouse.

10. The method of claim 6 wherein the map is configured for use with a computer software application, and wherein the computer software application is used to create or update predetermined picking paths in the warehouse.

11. The method of claim 6 wherein the map is configured for use with a computer software application, and wherein the computer software application is used to organize the storage of items in the warehouse.

12. The method of claim 6 wherein the map is configured for use with a computer software application, and wherein the computer software application is used to create or update alternative picking paths in the warehouse.

13. The method of claim 6 wherein the map is configured for use with a computer software application, and wherein the computer software application is used to define locations in the warehouse.

14. The method of claim 6 wherein the map is configured for use with a computer software application, and wherein the computer software application is used to simulate warehouse operations.

15. The method of claim 6 wherein the map is configured for use with a computer software application, and wherein the computer software application is used to facilitate replenishment or stocking of items in the warehouse.

16. The method of claim 6 wherein the map is configured for use with a computer software application, and wherein the computer software application is used to assist in financial audits.

17. The method of claim 6 wherein the locations are locations on a conveyer system for moving items within the warehouse, wherein the map is configured for use with a computer software application, and wherein the computer software application is used to schedule conveying operations.

18. A computer-readable storage medium, comprising contents configured to cause a computing system to generate a map of one or more item storage warehouses, by performing a method comprising:
   receiving data collected while traveling between locations in the one or more item storage warehouses, wherein the traveling is performed by one or more mobile elements;
   for each of the one or more mobile elements, using the received data to generate a record of movement times between locations to which the mobile elements traveled;
   based on the generated records of movement times for each of the one or more mobile elements, determining a collection of location pairs for which movement time information is available;
   for each of the location pairs in the collection, determining a set of observed movement times corresponding to movement between the locations of the location pair; and
   generating a map of the one or more item storage warehouses, wherein the generating includes determining an estimated movement time for each of the location pairs in the collection of location pairs; and wherein the estimated movement time is based on the set of observed movement times corresponding to the location pairs.

19. The computer-readable storage medium of claim 18 wherein the generating of the map includes determining an estimated movement time for location pairs for which movement time is not available.

20. The computer-readable storage medium of claim 18, wherein the method further comprises:
   after changes in the one or more item storage warehouses occur, gathering additional movement time data corresponding to the collection of location pairs; and
   updating the generated map to reflect the changes.

21. The computer-readable storage medium of claim 18 wherein one or more of the mobile elements are workers moving items within or between the one or more item storage warehouses, and wherein the workers travel within the one or more item storage warehouses on foot.

22. The computer-readable storage medium of claim 18 wherein one or more of the mobile elements are vehicles moving items between the one or more item storage warehouses.

23. The computer-readable storage medium of claim 18 wherein one or more of the mobile elements is an item or items on a conveyer belt.

24. The computer-readable storage medium of claim 18 wherein one or more of the mobile elements are totes on a conveyer belt, and wherein the totes contain items being moved within the one or more item storage warehouses.

25. The computer-readable storage medium of claim 18 wherein one or more of the mobile elements are workers moving items within in the one or more item warehouses, and wherein the workers travel within the one or more warehouses using vehicles.

26. A computer system for generating movement time maps of a distribution warehouse, the system comprising:
   means for assigning an identity to each location of a plurality of locations in the distribution warehouse so that each location of the plurality of locations in the distribution warehouse is uniquely identifiable;
   means for tracking the time it takes to travel between the uniquely identifiable locations in the warehouse, wherein the tracking includes generating records of location events; and
   means for generating a map of the distribution warehouse, wherein the map comprises a collection of temporal relationships between at least a portion of the uniquely identifiable locations in the distribution warehouse, and wherein the temporal relationships are based on actual movement times obtained from the generated records of location events and estimated movement times derived from the actual movement times.

27. The system of claim 26 wherein one or more of the estimated movement times are derived based on movement times associated with a single intermediary location.

28. The system of claim 26 wherein one or more of the estimated movement times are derived based on movement times associated with two intermediary locations.

29. The system of claim 26 wherein one or more of the estimated movement times are derived based on movement times associated with more than two intermediary locations.

30. The system of claim 26 wherein one or more of the estimated movement times are derived based on averaging movement times for location pairs adjacent to a location pair for which actual movement time data is not available.

31. The system of claim 26 wherein one or more of the estimated movement times are derived by replacing available sets of actual movement time data with an analytic function that computes arbitrary points.

32. The system of claim 26 wherein the location events include scanning a bar code on an item that is being retrieved from one of the uniquely identifiable locations in the warehouse.

33. The system of claim 26 wherein the location events include scanning a bar code associated with one of the uniquely identifiable locations in the warehouse.

34. The system of claim 26 wherein the location events include RFID events that occur automatically when the uniquely identifiable locations are visited.

35. The system of claim 26 wherein the location events include triggering a photoeye sensor at a known location.

36. The system of claim 26 wherein the location events are captured on a digital video camera, and wherein the location events may be analyzed by a computer to determine the location of a mobile element at a given time.

37. A method for generating and updating a warehouse map based on movement times between identifiable locations in the warehouse, the method comprising:
   generating a map of the warehouse based on empirical movement time data collected during operation of the warehouse, wherein the generated map includes movement times between uniquely identifiable locations in the warehouse;
   after the map of the distribution warehouse is generated, continuing to collect empirical movement time data during operation of the warehouse; and
   based on the continued collection of empirical movement time data, updating the generated map of the warehouse to reflect changes in movement times or changes in locations.

38. The method of claim 37 wherein the generated map further includes estimated movement times, and wherein the estimated movement times are derived based on the empirical movement time data collected during operation of the warehouse.

39. The method of claim 37 wherein the generated map further includes seeded movement times, wherein the seeded movement times result from movement time data collected for the purpose of generating the warehouse map.

40. A method for scheduling the collection of items in a warehouse so that the collected items can be used to complete orders to be shipped to customers, the method comprising:

generating a map of the warehouse based on empirical movement time data collected during operation of the warehouse and movement time data derived from the empirical data, wherein the generated map includes movement times between uniquely identifiable locations in the warehouse;

based on the generated map, determining a schedule for collecting items in the warehouse in preparation for shipping, wherein the determining of the schedule includes assigning a picker to collect items, assigning an order for items to be collected by each of the assigned pickers, and assigning a target time for completing the collecting of each of the items; and providing the determined schedule to the assigned pickers.

41. The method of claim 40 wherein the determined schedule is provided on mobile devices carried by each of the assigned pickers.

42. The method of claim 41 wherein the target time for at least one of the items is an estimate of a best movement time that is determined by assessing a top percentile of movement times from the empirical movement time data.

43. The method of claim 41 wherein the target time for at least one of the items is an estimate of an average movement time that is determined by assessing a middle percentile of movement times from the empirical movement time data.

44. The method of claim 41 wherein the target time for at least one of the items is determined using a most frequently observed value between a pair of the uniquely identifiable locations in the warehouse.

45. A method for mapping an item storage and distribution facility using movement time data collected between specified locations in the item storage and distribution facility, the method comprising:

tracking the movement of item pickers between a first location and one or more secondary locations in the item storage and distribution facility, wherein the tracking includes generating a first set of movement time records including indications of the time it takes to move between the first location and each of the secondary locations, and wherein the movement of the item pickers between the first location and the one or more secondary locations is associated with collecting items for fulfilling customer orders;

tracking the movement of item pickers between a third location and each of the one or more secondary locations, wherein the tracking includes generating a second set of movement time records including indications of the time it takes to move between the third location and each of the secondary locations, and wherein the movement of the item pickers between the third location and each of the one or more secondary locations is associated with collecting items for fulfilling customer orders;

generating a map of the item storage and distribution facility based, at least in part, on the first and second sets of movement time records; and where movement time records between the first location and the third location are not available, deriving an estimate of the movement time between the first location and the third location based on at least one movement time record within the first set of movement time records and at least one movement time record from the second set of movement time records.

46. The method of claim 45 wherein the deriving of an estimate of the movement time between the first location and the third location includes multiple extrapolation steps.

47. One or more computer memories collectively containing a data structure for use in generating a map of a warehouse, wherein the map depicts points of interest in the warehouse and their relative locations in terms of movement times between the points of interest, the data structure comprising:

an indication of a first point of interest in the warehouse;

an indication of a second point of interest in the warehouse;

an indication of a movement time between the first point of interest and the second point of interest, wherein the movement time corresponds to the time it takes a mobile element to travel between the first point of interest and the second point of interest for the purpose of transporting one or more items to or from the first and second points of interest; and an indication of a frequency of the movement time between the first point of interest and the second point of interest.

48. The one or more computer memories of claim 47 wherein at least one of the first and second points of interest is a location where items are stored in the warehouse.

49. The one or more computer memories of claim 47 wherein at least one of the first and second points of interest is a point on a conveyer belt in the warehouse.

* * * * *